No. 760,514. PATENTED MAY 24, 1904.
J. B. BARTHOLOMEW.
CORN PLANTER.
APPLICATION FILED NOV. 8, 1894. RENEWED NOV. 18, 1903.
NO MODEL. 6 SHEETS—SHEET 1.

No. 760,514. PATENTED MAY 24, 1904.
J. B. BARTHOLOMEW.
CORN PLANTER.
APPLICATION FILED NOV. 8, 1894. RENEWED NOV. 18, 1903.
NO MODEL. 6 SHEETS—SHEET 3.

WITNESSES
INVENTOR

No. 760,514. PATENTED MAY 24, 1904.
J. B. BARTHOLOMEW.
CORN PLANTER.
APPLICATION FILED NOV. 8, 1894. RENEWED NOV. 18, 1903.

NO MODEL. 6 SHEETS—SHEET 4.

Witnesses:
Chas. W. La Porte,
M. B. May

Inventor.
J. B. Bartholomew
by
H. H. Bliss
Attorney.

No. 760,514. PATENTED MAY 24, 1904.
J. B. BARTHOLOMEW.
CORN PLANTER.
APPLICATION FILED NOV. 8, 1894. RENEWED NOV. 18, 1903.
NO MODEL. 6 SHEETS—SHEET 5.

WITNESSES
Chas. W. LaPorte
M. B. May

INVENTOR
J. B. Bartholomew
by
H. H. Hess
Attorney

No. 760,514. PATENTED MAY 24, 1904.
J. B. BARTHOLOMEW.
CORN PLANTER.
APPLICATION FILED NOV. 8, 1894. RENEWED NOV. 18, 1903.
NO MODEL. 6 SHEETS—SHEET 6.

Witnesses:
Chas. H. LaPorte,

Inventor.
J. B. Bartholomew
by
H. H. Bliss
Attorney.

No. 760,514. Patented May 24, 1904.

UNITED STATES PATENT OFFICE.

JOHN B. BARTHOLOMEW, OF PEORIA, ILLINOIS, ASSIGNOR TO AVERY MANUFACTURING COMPANY, OF PEORIA, ILLINOIS.

CORN-PLANTER.

SPECIFICATION forming part of Letters Patent No. 760,514, dated May 24, 1904.

Application filed November 8, 1894. Renewed November 18, 1903. Serial No. 181,741. (No model.)

*To all whom it may concern:*

Be it known that I, JOHN B. BARTHOLOMEW, a citizen of the United States, residing at Peoria, in the county of Peoria and State of Illinois, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

Fig. 5 is a side elevation of the machine. Figs. 6, 7, and 8 illustrate the movable wire-guide and its lock in three several positions. Fig. 9 is a section of one of the wire-guide pulleys. Fig. 10 shows the joint of the marker-bar. Fig. 11 is a plan, and Fig. 12 a side view, of one of the wheel-spindles. Fig. 13 shows a seed-wheel of one form. Fig. 14 is a section of another form of wheel, the driving devices, and the supporting-plate. Fig. 15 is a front view, and Fig. 16 is a plan, of the seeding mechanism on a larger scale. Fig. 38 is a top view.

One of the objects of the present invention is to so construct and arrange the parts of a planter that substantially the whole machine can be made of metal, as steel, and therefore be stronger and more durable than those heretofore used.

I am aware that planters with metallic frames have been made or proposed; but to all within my knowledge have been incident objectionable features which I aim to overcome. I reduce the weight by simplifying the mechanism and dispensing with a number of the parts heretofore used.

Figures 5, 6, 7, 8, 9, 10, 11, 12, 13, 14:
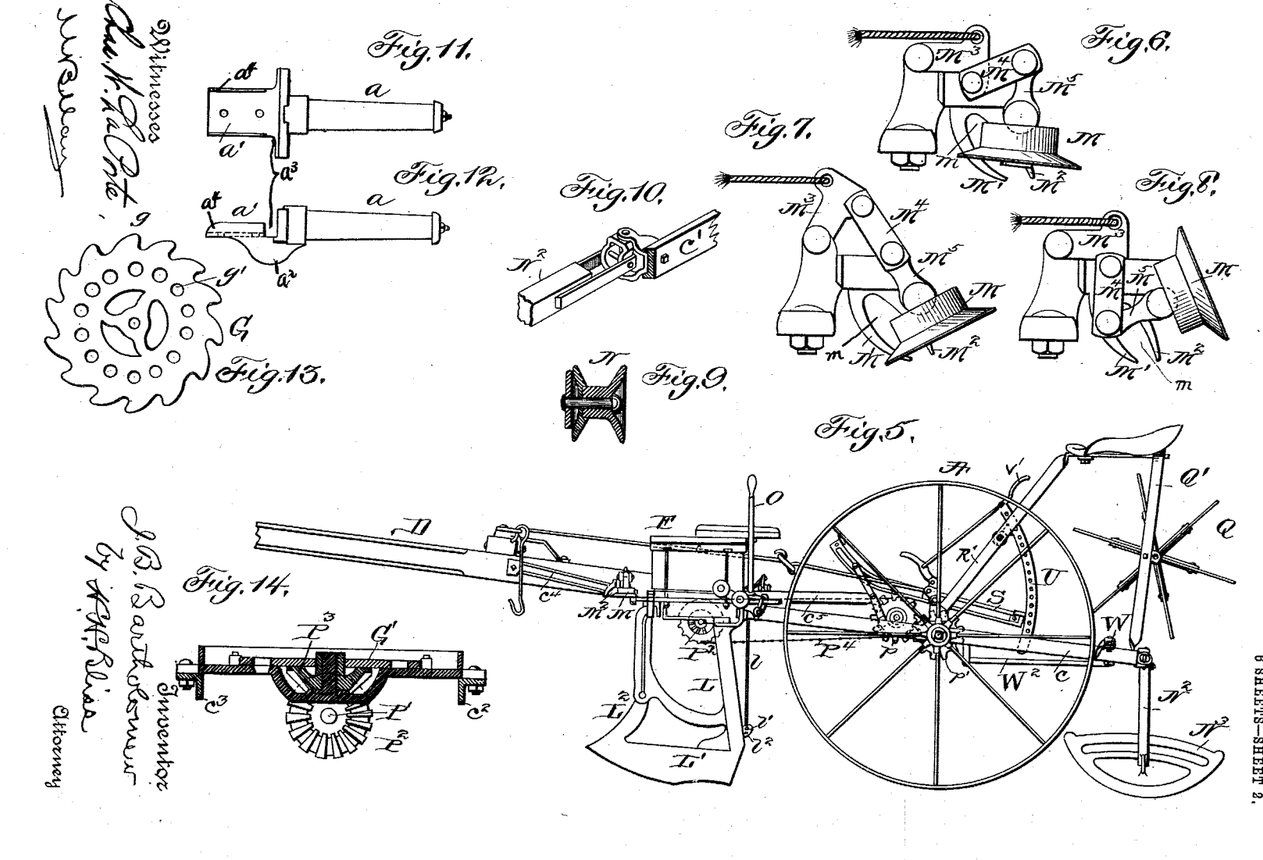

The main ground-wheels are indicated by A A'. The central main portion of the axle B is formed of hollow square steel tubing. At the ends it is secured to peculiarly-shaped spindles $a$, each formed with or secured to a flanged plate $a'$, upon which the axle B can be firmly bolted or riveted. These wheel-carriers are shown in detail in Figs. 11 and 12, by reference to which it will be seen that the spindle $a$ and axle-supporting plate $a'$ are connected by a depending or downwardly-curved web $a^2$, in the upper surface of which is formed a seat or recess $a^3$ to receive the lower edge of the adjacent side $c$ of the frame C. The plate $a'$ is provided with upwardly-extending side flanges $a^4$, thus forming a seat into which the end of the axle B fits snugly, it being also connected to the plate $a'$ by bolts, as above described. Upon the axle B is supported the main frame C C'. This also is made of steel, the wheel-supporting portion C being formed of a bar bent to provide the side pieces $c\ c$ and the rear connecting part $c'$. At the front it is hinged to the runner-frame C', as at $c^6\ c^6$, the said runner-frame comprising a longer transverse angle-bar $c^2$ at the front and a shorter angle-bar $c^3$ at the rear, together with the brace-bars $c^4$ and the rearward-extending V-shaped brace formed of bars $c^5$ for connecting the frame to the adjusting devices. The frames C C' can be rocked relatively to each other upon the hinges at $c^6$ by devices to be described. The tongue D extends across and is secured to the angle-bars $c^2$ $c^3$ of the front or runner frame. At the outer ends the bars $c^2$ $c^3$ are connected by curved bars E', and the latter are also connected to the front bar $c^2$ by curved arms E. Upon the frame thus provided the seed-dropping apparatus is supported. It comprises at each end a box, as at F, in the bottom of which there is a seed-plate which for check-row planting is of the form shown at G, Figs. 13 and 16, it having pawl-teeth $g$ and seed-apertures $g'$, but which for drilling is provided with a gear-wheel, as shown in Fig. 14. Above the seed-plate G lies the concaved bottom $G^2$, Figs. 38 to 41, of the seed-box, having a cut-off $G^3$ and the spring-pressed pusher $g^2$, which forces the seed out of the apertures $g'$. When the machine is used for check-rowing, the seed-plate is turned by a pawl or follower.

Figures 17, 26, 27, 28:
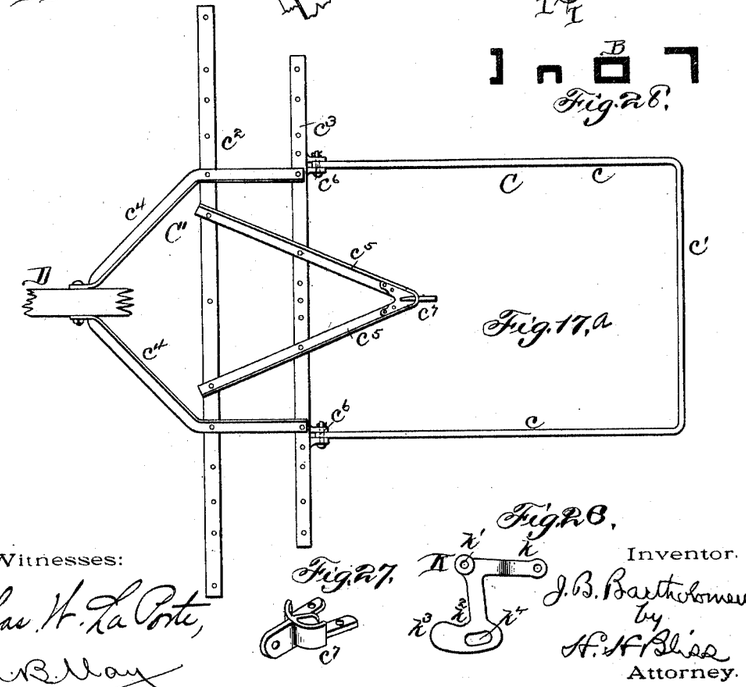
Fig. 17 is a detail, partly in section, of one of the seed-tubes and its valve mechanism. Fig. $17^a$ shows the steel frame detached.
Figs. 19 to 26, inclusive, show detached some of the parts in Fig. 18.
Fig. 27 shows the center hinge of the front runner-frame detached.
Fig. 28 presents cross-sections of different parts of the frame.
Figures 18, 19, 20, 21, 22, 23, 24, 25:
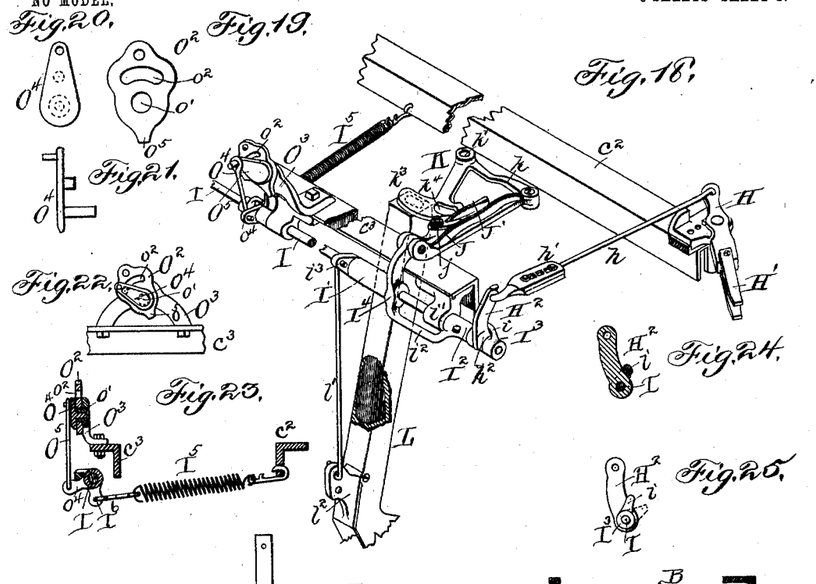
Fig. 18 is a perspective of parts of one of the seeding mechanisms.
Figures 29, 30, 31, 32, 33, 34, 35:
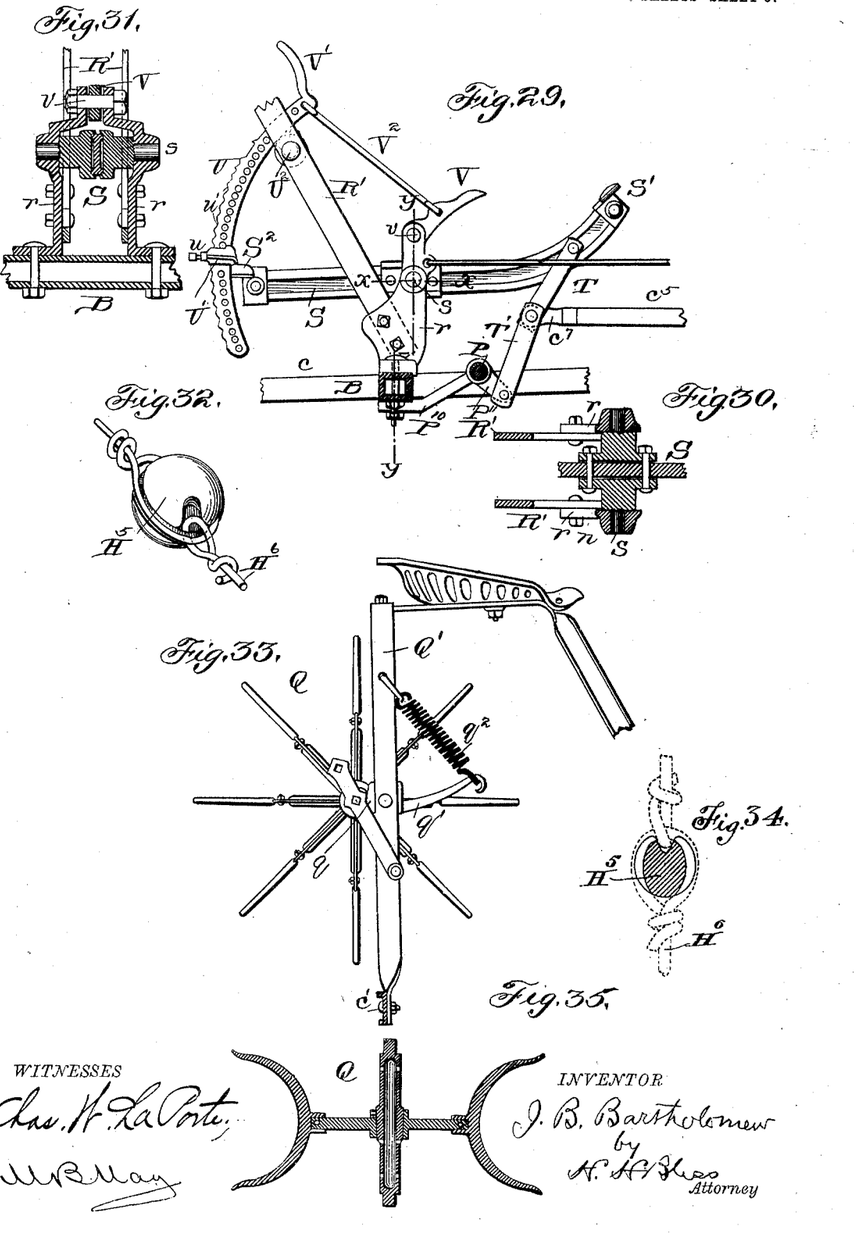
Fig. 29 is a side view of parts of the runner-frame-adjusting mechanism.
Fig. 30 is a section on line $x\ x$ of Fig. 29.
Fig. 31 is a section on the line $y\ y$ of Fig. 29.
Fig. 32 shows one of the check-balls detached.
Fig. 33 is a side view of the wire-reel.
Fig. 34 is a sectional view of the check-ball.
Fig. 35 is a section of the reel.

H is a lever pivoted to the outer end of the frame and carrying the fork H', with which the balls $H^5$, Fig. 32, on the wire $H^6$ intermittingly engage. The lever H turns a rock-shaft I, which is mounted in bearings $i''$ below or behind the frame-bar $c^3$. Motion is transmitted through an adjustable link $h$ $h'$, the length of which can be varied to regulate the throw of the shaft I. The link is pivoted to a crank-arm $H^2$, which is loosely hinged or mounted on the shaft I by an eye $h^2$, fitted thereon. On the shaft I there is rigidly secured a sleeve I', which is cast with the sleeves $I^2$ $I^3$. The part I' is connected with the part $I^2$ by a bowed arm $i^2$, and the parts $I^2$ $I^3$ are connected by an arm $i$. When the crank-arm $H^2$ is drawn forward, it engages with the arm $i$ and shaft I is rocked; but it will be seen that the shaft can be rocked independently of the crank $H^2$, as the latter is loose thereon, and the arm $i$ can swing forward without moving the crank-arm. (See Fig. 25.) When the shaft I is rocked forward, it throws forward the crank $I^4$, preferably formed with the sleeve I'. At the upper end this crank is hinged to a link J, which extends under the seedbox. It is formed with an offset $j$, on which is loosely pivoted the pawl J', adapted to engage with the teeth $g$ on the seed-plate successively. At the end the bar J is hinged to the arm $k$ of a bell-lever K, which is pivoted at $k'$ below the seed-plate and the other arm of which terminates in an expanded plate having the seed-passage $k^4$ and the cut-off $k^3$, as shown in Figs. 18 and 26. It will be seen that when the balls $H^5$ intermittingly engage with the fork H' and press it backward the shaft I will be rocked forward, which results in advancing the seed-plate one tooth, and thereby brings one of the seed-apertures $g'$ into position to register with the conducting-tube L; but at this time, while the arm or crank $I^4$ of the shaft I is at its forward limit, the cut-off plate $k^3$ intervenes between the upper end of the tube and the seed-plate, so that the charge of seed cannot leave the aperture $g'$, and at this time the valve $l^2$ in the tube L is open, thus permitting the charge of seed delivered to said tube to drop from it. As soon as the ball $H^5$ escapes from the fork H' all the parts but the seed-plate are returned to their normal positions by the spring $I^5$. This is connected to the cross angle-bar $c^2$ and to the crank $I^6$, secured to the shaft I. When the shaft I and its connections are thus returned to their normal positions, the valve $l^2$ in the tube L is closed and the seed-passage $k^4$ through the cut-off plate registers with the aperture $g'$, permitting the charge brought forward by the latter to fall into the tube L, there to be retained by the valve $l^2$ until the fork H' is again engaged by a ball $H^5$, when the operations and movements above described will be repeated. It will be understood that the actuating devices of both seeding mechanisms will be similarly and simultaneously moved, and as the cranks $H^2$ on both sides of the machine are loose in relation to the shaft it will be seen that the check-row wire can be used on either side without compelling the movement of the fork, its link, and crank on the other side. Mechanism of this sort enables me to dispense entirely with the slides and slide-guides which have been heretofore commonly used and to which has been incident much difficulty from friction, the loss of power, &c. In the present machine all the motions are vibratory, with the well-known advantage incident thereto.

With the check-row mechanism described there is provision also for a hand operation, use being made of the same rock-shaft and attachments and in such way as to be entirely independent of both check-rowers, which are, however, not removed from their places.

Figures 15, 16, 17:
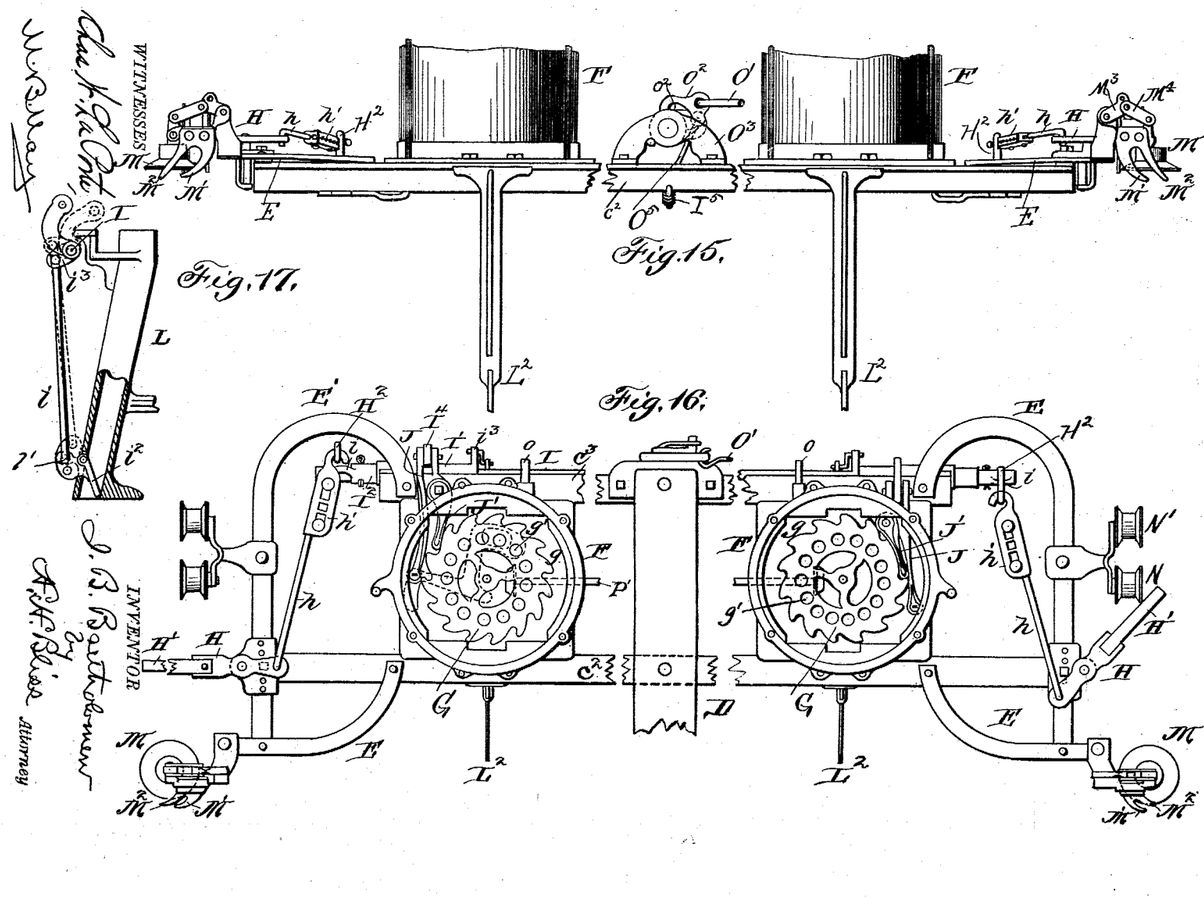

O is a hand-lever adapted to be pivoted on either of the pivots $o$, Fig. 16. It is connected by a link O' to a swinging plate $O^2$, Figs. 18 to 22, pivoted at $o'$ to a bracket $O^3$. $O^4$ is a swinging lever also pivoted at $o'$. Its movements on its axis are limited by the plate $O^2$, which has a slot $o^2$, in which is seated a stud projecting from the lever $O^4$. The lever carries a link $O^5$, which connects it to a crank $o^4$, projecting outward from shaft I. The plate $O^2$ is limited in its swing by a projection $o^5$, which impinges alternately on the opposite sides of the standard $O^3$. It will be seen that when the hand-lever O is moved in one direction it will through the link O' raise the plate $O^2$ and that the latter will draw upward the lever $O^4$. When the lever $O^4$ is in the upright position, it has rocked the shaft I the proper distance to move the pawl J' and the other parts which actuate the seeding mechanism. As soon as the lever O⁴ passes the upright position it will be instantly carried down the length of the slot o² because of the tension of spring I⁵, and this causes a quick return of the seed-actuating devices to their normal positions, and this is true in whichever direction the hand-lever O and the plate O² are moved—that is to say, the lever O⁴ rises to the vertical line under the pressure from the hand-lever, then instantly moves on and down on the opposite side from the tension of the spring I⁵. Plate O² and the operating parts connected therewith are inactive when the check-rowers are in use. The seed which drops is conducted through the tubes L into the furrows, which are formed by the openers L' and the cutters or colters L². Within and near the lower end of each tube L there is a valve $l^2$, and an operating-rod $l$ is connected to such valve at its lower end and at the upper end is hinged to a crank $i^3$ on the crank-shaft I. When the rock-shaft begins to move, it first opens the valve $l^2$, allowing the charge of seed in the tube L to escape therefrom, and subsequently causes the seed-plate to deliver another charge to the tube, the valve closing before the last-said charge can escape from the tube.

The check-row wire is guided to the fork H' by the following devices: M is a normally horizontal guide-sheave situated directly behind the forked fingers M' M², the three being situated to form the wire-passage $m$, and the wire has a rolling support from the presence of the sheave, which is carried by a lever M⁵, which is pivoted to a suitable support at an intermediate point of its length and at its upper end is pivoted to a link M⁴, which in turn is pivoted to a lever M³, these parts providing a toggle connection for the sheave. A cord extending from near the operator is connected to the lever M³, and by means of these he can throw the sheave M from the closed position (see Fig. 6) to the open position (shown in Fig. 8) and in doing so permit the wire to instantly escape, as is necessary at the end of each row, so that the machine can be turned, and accomplish this without leaving his seat. Behind the fork the wire is supported between a forward flanged roller N and a similar one, N', below and in the rear of said roller N. In order to guide the driver, a marker N³ is employed, supported on a bar N² at the rear of the machine.

Figure 1:
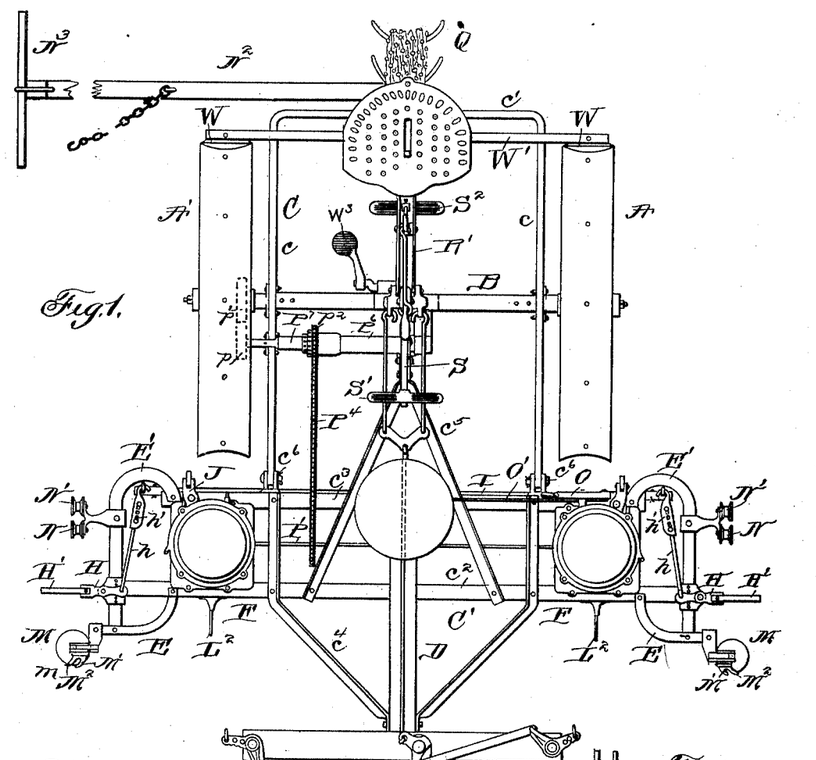
Figure 1 is a plan view of a planter having my improvements.
Figures 2, 3, 4:
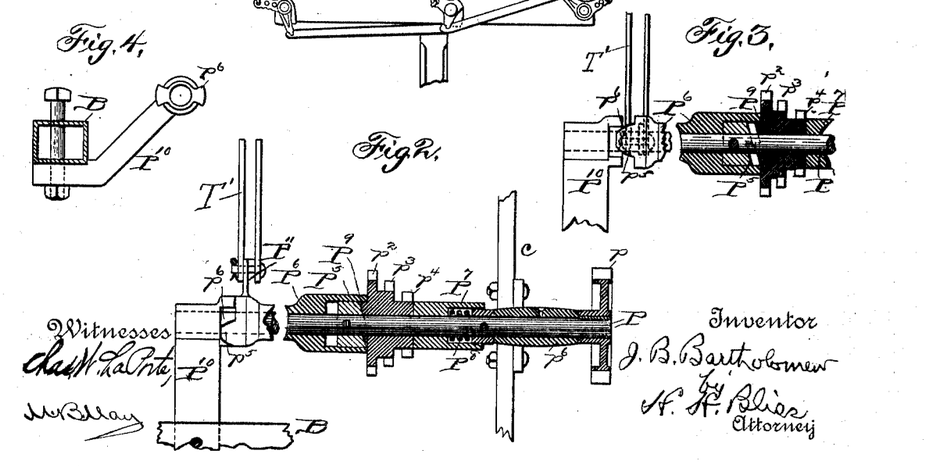
Fig. 2 shows, partly in plan, partly in section, the devices which actuate the drill, the clutch being closed.
Fig. 3 shows a portion of the same parts when the clutch is open.
Fig. 4 shows the axle in section and the arm which supports the drill-clutch.

When it is desired to use the machine for drilling instead of planting intermittingly, a seed-plate like that in Fig. 14 is employed. It has a bevel-gear P³, which meshes with a wheel P² on a transverse shaft P', which extends from one seedbox to the other and is rotated by a chain P⁴, receiving power from the shaft P. This shaft is mounted on the main frame and is rotated by the wheel $p$, which engages with a wheel $p'$, secured to the ground-wheel A'. It is provided with a series of different-sized wheels or cone-gears $p^2 p^3 p^4$, with either of which the chain P⁴ can be engaged, according as a faster or slower speed is desired. The shaft P (see Figs. 2 and 3) passes loosely through the wheels $p^2 p^3 p^4$ (preferably integral) and also loosely through a chambered sleeve P⁶. In the chamber of this sleeve there is a clutch P⁵, which is secured to the shaft and which is adapted to engage with the clutch-teeth P⁹ on the chain-wheel. P⁷ is a chambered sleeve on the opposite side of the wheel, which contains a spring P⁸, which normally acts to press the clutch-teeth P⁹ of the chain-wheel into engagement with the clutch P⁵.

At times it is desirable to prevent the chain and chain-wheel from moving, as when the machine is being turned at the end of a row. To accomplish this, I form on the sleeve P⁶ an arm P¹¹ and a cam-like surface $p^5$ at its end (see Figs. 2 and 3) and combine with them opposing cams $p^6$, which are carried by an arm P¹⁰, that rocks about the axis of the ground-wheel. When the arms P¹⁰ P¹¹ rock, which occurs when the runner-frame is lifted up, the cams at $p^5 p^6$ press the sleeve at P⁶ outward and push the chain-wheel away from the clutch P⁵, and thereupon the chain stops and the seeding mechanism is stationary; but as soon as the frame is lowered the cams $p^5 p^6$ are so moved out of engagement that the spring at P⁸ can force the chain-wheel and the sleeve P⁶ inward and produce engagement between the clutch and chain-wheel, when the drilling action will recommence.

When the check-row wire is not in use, it is wound upon the reel Q. (Shown in Figs. 33 and 35.) It is mounted in a bow-frame Q', extending from the frame-bars $c$ up to the driver's seat. The reel has on one side a closed bearing and on the other side an open bearing $q$, Fig. 36, in which it is secured by a movable lock-arm $q'$, normally held in place by the spring $q^2$.

The runner-frame is vertically adjusted relatively to the wheel-frame by the devices shown somewhat enlarged in Figs. 29 to 31. $r r$ are brackets or standards secured to and rising from the axle B. The seat-support R' is rigidly secured to these brackets. S is a foot-lever pivoted at $s$ in the brackets $r$ and extending forward and back from the pivot to points within reach of the driver's feet. At the front it is provided with a transverse pedal S' and at the rear with a pedal S². It is flexibly connected to the runner-frame, which supports the seeding mechanism, by one or more links T, pivoted to the eye $c^7$ at the rear end and joining the bars $c^5$ of the runner-frame. When the lever S is free to rock on the pivot at $s$, the weight of the forward part of the machine pulls down the link T and the front end of the lever S. To lock the lever against such rocking on the pivot, I employ a curved stop-bar U, practically concentric with the pivot at $s$, but capable of a limited oscillation on its pivot at $U^2$. The upper end lies between and extends somewhat beyond the seat-bars R', and the lower end extends to or somewhat beyond the lowest point ever reached by the lever S. The bar U is provided with an adjustable stop U', against which the rear end of the lever S or some part connected therewith, such as the pedal $S^2$, can engage, and when engaged the lever will be locked and the rear end prevented from rising. The stop U' can be adjusted, as the rear edge of the bar U is provided with a series of recesses $u'$, with which the set-screw $u$ can engage. When the runner-frame is in the position for planting or drilling, the parts last above described are in a position approximating that shown in Fig. 29, the stop U' being in position to hold the frames as described when it works, but adjustable as above described. At this time the rear part of the runner-frame and the forward part of the wheel-frame tend to swing downward, and the bars $c^5$ draw down the link T, which in turn pulls down the front end of lever S and forces up the rear pedal $S^2$ against the stop U'. If for any purpose it should be desired to let the runners drop deeper than is permitted by the stop U', the operator can with his foot disengage the stop, whereupon the parts in front of the axle will tend to move downward; but when it is desired to take the runners up from the ground entirely it is done by the driver pressing down the pedal $S^2$, which results in drawing up link T and elevating the runner-frame, and the lever S is locked in this position automatically by the bar U, which swings forward sufficiently far to have its free end come over the pedal $S^2$ and thereafter prevent the latter from rising, which locks the runner-frame in its elevated position. To move the bar U, there is a lever V within reach of the operator's foot, it being pivoted at $v$ to the brackets $r$. It is connected by a link $V^2$ to the upper end of bar U. When it is desired to unlock bar U and lever S, slight pressure on pedal $S^2$ is exerted with one foot and pressure on lever V with the other, the latter resulting in throwing bar U back, so that the pedal $S^2$ can rise and the forward end of lever S descend, permitting the runner-frame to return to the ground for action.

I dispense with the hand-levers ordinarily used for adjusting the vertical position of the runner-frame relatively to the wheel-frame, the parts in this machine being so related with respect to each other that the driver can by his feet alone easily move the frames into any desired relative position; but to provide for moving the bar U by hand when occasion requires I furnish it with a handle V', by which the driver can actuate it by hand when it is inconvenient to do so with his foot.

There are links T' which connect the arm $P^{11}$ (hereinbefore referred to) on sleeve $P^6$ with the runner-frame or the lever S mediately or immediately, and when the lever S is moved up at the front end with the runner-frame these links T' pull the arm $P^{11}$ upward and turn the sleeve $P^6$ on shaft P and compel the cams $p^5$ and $p^6$ to disengage the clutch-teeth at $P^5 P^9$, after which the sprocket-wheels and chain will be inactive. When the runner-frame is again lowered, (in the way described,) the arm $P^{11}$ rocks relatively downward, and the cams at $p^5$ pass those at $p^6$ again under pressure of the spring, and the clutch is engaged and the sprocket-wheels are rotated.

Figures 36, 37:
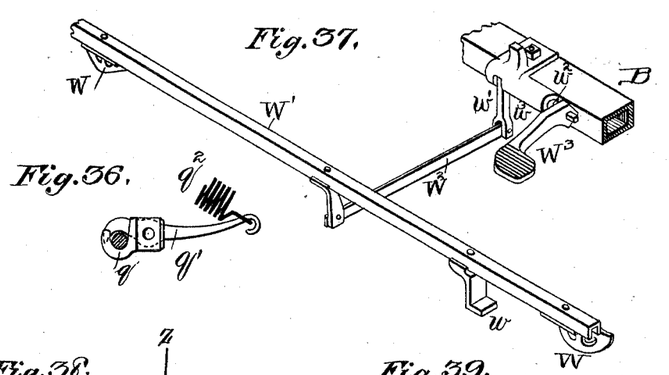
Fig. 36 shows the spring-fastener for the reel.
Fig. 37 is a perspective of scraping devices.
Figure 38:
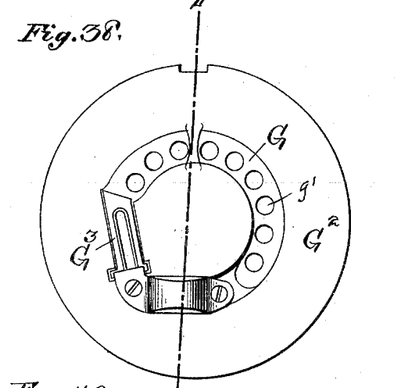
Figure 39:
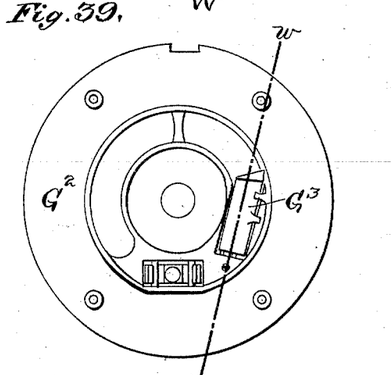
Fig. 39 is a bottom view, of the bottom plate of the seed-hopper.
Figure 40:
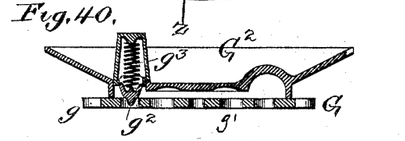
Fig. 40 is a section on the line $z\ z$ of Fig. 38.
Figure 41:
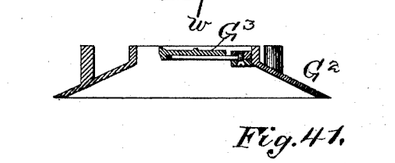
Fig. 41 is a section on the line $w\ w$ of Fig. 39, inverted.
Figures 42, 43:
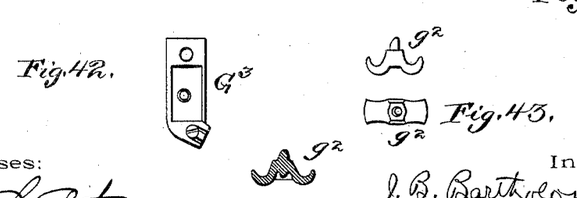
Fig. 42 shows the cut-off.
Fig. 43 shows in side, top, and sectional views the seed-ejector.

The peripheries of the wheels A A' are cleaned by means of scrapers W W, curved to conform to the said peripheries and attached to a sliding bar W. The latter has guide-clips $w$, fitted to the side bars $c$ of the steel frame and which permit it to slide bodily thereon.

$W^2$ is a link connected to bar W' and hinged to the crank $w'$ of a crank-shaft $w^2$, which is rocked by a pedal-crank $W^3$ within reach of the driver's foot, the rock-shaft being mounted in a bearing $w^3$.

From the foregoing description and the drawings it will be seen that the power or actuating devices both for intermittent planting and drilling are all permanently supported in the frames of the machine, but are entirely independent of each other.

By such a construction and arrangement of parts as I have illustrated and described it is possible to simultaneously drill from one of the hoppers and plant intermittingly from the other.

I am aware that prior to my invention it has been proposed to provide a planter which could be arranged to plant seed intermittingly or continuously; but in all of the earlier constructions with which I am acquainted one or more members of the actuating devices were employed in both operations, and besides shifting the seed-plates in the hoppers it was necessary to either remove or disconnect some of the parts used in intermittent planting to adapt the machine for drilling.

With my construction in order to adapt the machine for drilling it is merely necessary to change the seed-plate and to connect the link with the lower hole provided therefor in the valve $l^2$, which will maintain an open passage-way through the conducting-tube L for the seeds.

What I claim is—

1. In a corn-planter the combination of a wheel-frame having parallel side bars $c$ and a rear cross connecting-bar $c'$, and a forward runner-frame composed of parallel bars $c^2$, $c^3$ extending transversely of the wheel-frame, the bar $c^3$ being hinged to the bars $c$, the bars $c^4$ connecting said transverse extending-bars together and to the tongue of the machine, and the rearwardly-converging bars $c^5$ also connecting said bars $c^2$, $c^3$, substantially as set forth.

2. In a planter, a wheel-frame having the side bars $c$, $c$ and a cross connecting-bar, in combination with the wheel-carriers having the spindles $a$, the plates $a'$ adapted to support and be connected to the axle, and the seats formed in the wheel-carriers to receive the said side bars $c$, substantially as set forth.

3. In a planter, the combination with the wheel-frame having the side bars $c$, a cross-bar, and an axle, of the wheel-carriers secured to the opposite ends of the axle, said carriers being provided with spindles on which the wheels are mounted, and with seats for the side bars of the wheel-frame arranged between the ends of the axle and the said wheel-spindles, substantially as set forth.

4. In a corn-planter, the combination of the tongue, the wheel-frame, having parallel side bars $c$ and a rear cross connecting-bar $c'$, and a forward runner-frame, composed of parallel bars extending transversely of the wheel-frame, the forward ends of the side bars $c$ of the wheel-frame being hinged to one of the said transverse bars, the brace-bars $c^4$ connecting the said transverse bars together, and to the tongue of the machine, and being connected with their cross-bars immediately adjacent to the hinging connection of the wheel-frame, and the rearward-extending V-shaped brace $c^5$ also connecting the transverse bars and arranged inside of or between the brace-bars $c^4$, substantially as set forth.

5. In a planter, the combination with the axle, and the side bars $c$, of the wheel-frame, of the wheel-carriers having the outwardly-extending spindles and inward-extending plates, with seats to receive the ends of the axle, and the connecting parts between the spindles and plates and arranged to form seats for the side bars $c$ and embracing more or less of the same, substantially as set forth.

6. In a corn-planter, an axle, wheel-carriers having spindles in the horizontal plane of the axle, each spindle having an offset from the said plane which is connected with the axle, and a metallic frame having side bars in the plane of the axle and spindles and detachably connected to said offset, substantially as described.

7. The combination of an axle, a wheel-spindle at each end of the axle having an open recess in its upper face in which recess the axle is secured, and a frame adapted to have its side bars seated in and extend through the said recesses in the wheel-spindle, substantially as set forth.

8. In a planter, the combination of the wheel-spindles having at their inner ends the plates $a'$, an axle having its ends connected to the plates $a'$ at points inside of the inner ends of said spindles to form the inner walls of recesses $a^3$, and a frame C having its side bars seated in said spaces $a^3$ between the outer ends of the axle and the inner ends of the wheel-spindles, substantially as set forth.

9. In a planter, the combination of the wheel-spindles having the inwardly-extending plates $a'$, provided at their sides with flanges $a^4$, the axle having its ends fitted between said flanges $a^4$, on the wheel-spindle plates, and a frame supported on said spindles at points outside of the ends of the axle, substantially as set forth.

10. In a planter of the class described, the combination with the supporting-wheels, the runners, the seed-dropping mechanism, and the check-row mechanism, of the steel frame having the cross angle-bars $c^2$, $c^3$ connected at the outer ends by the bars E, E', substantially as and for the purposes set forth.

11. In a planter, the combination with the seeding mechanism, of the rock-shaft, adapted to actuate the seeding mechanism, having thereon a lug $i$, a reciprocating lever, adapted to be engaged by the balls on a check-row wire, an intermediate lever loosely mounted on the rock-shaft in line with the lug $i$, connections between the intermediate lever and the reciprocating lever, and a spring connected to the rock-shaft for returning the parts to their normal positions, substantially as set forth.

12. In a corn-planter, the combination of a rock-shaft adapted to operate the seed-dropping devices, a retracting-spring arranged to turn the shaft in one direction, operating-levers arranged to turn the shaft against the spring, an intermediate lever, a connection between the rock-shaft and the said intermediate lever arranged to cross the line of the fulcrum of the lever, whereby the shaft is moved against the action of the spring as the lever is moved to carry the said connections to the fulcrum-line, and with the spring after passing such line, and a loose connection between the operating and the intermediate lever, substantially as set forth.

13. In a corn-planter, a seed-dropping mechanism, means for intermittingly operating said mechanism, a reciprocating lever for such operating means, and a connection between said lever and the operating means arranged to cross the pivot of the said lever as a dead-center in either direction substantially as set forth.

14. In a corn-planter, a seed-dropping mechanism, means for intermittingly operating such mechanism, and a spring for retracting such means, a reciprocating lever for said operating means, and a connection between said lever and the said operating means arranged to cross the fulcrum of pivot of the lever as a dead-center in moving in either direction, substantially as set forth.

15. In a corn-planter, a seed-dropping mechanism, means for intermittingly operating said mechanism, and a spring for retracting such means, a reciprocating lever for said operating means, a connection between said lever and the said operating means arranged to cross the pivot of the lever as a dead-center in moving in either direction, and means for reciprocating said lever including a lost-motion connection substantially as set forth.

16. In a corn-planter the combination with a seed-plate, and an intermittingly-acting rock-shaft, of a lever connected to said shaft, a pawl carried by the lever and adapted to engage with and move the seed-plate, and a cut-off connected to the same lever as the pawl for closing the discharge-opening in said seed-plate, substantially as set forth.

17. In a corn-planter, the combination with a seed-plate, and an intermittingly-acting rock-shaft, of a lever connected with said shaft, a pawl connected to said lever and adapted to move the seed-plate, and a bell-crank lever connected to the same lever as the pawl and carrying a cut-off plate adapted to regulate the passage of seed from the seed-plate, substantially as set forth.

18. The combination with a seed-plate, and intermittingly-acting mechanism connected with a pawl for actuating said seed-plate of a cut-off plate connected to said intermittingly-acting mechanism and moving in a path at substantially right angles to that of the pawl, substantially as set forth.

19. The combination with the intermittingly-acting seeding mechanism, of the reciprocating pawl, a lever, a vibrating plate connected to the lever, a second lever engaging with the aforesaid plate and adapted to move therewith and also independently thereof, and means connecting the second lever with the pawl, substantially as set forth.

20. The combination with the seeding mechanism and the actuating devices engaging therewith, of the plate $O^2$, the lever connected therewith for moving it, the plate $O^4$ movable with and independently of the plate $O^2$, and the stops for limiting the movements of said plates relatively to each other, substantially as set forth.

21. In a planter, the combination with a supporting-frame, a seeding mechanism supported on the frame, and a rock-shaft mounted in bearings on the frame, and connected with the seeding mechanism, of check-row devices adapted to actuate said shaft, a plate pivoted on the supporting-frame, a hand-lever connected with the plate, and a link having one end rigidly connected to the rock-shaft and having its other end loosely connected to the said pivoted plate, substantially as set forth.

22. In a planter, the combination with the supporting-frame and the seeding mechanism thereon, of a rock-shaft mounted in bearings on the frame and connected with the seeding mechanism, devices for automatically actuating the shaft, a hand-lever, a plate $O^2$ pivoted on the frame and connected with the hand-lever, another plate $O^4$ pivoted on the frame and having a stud projecting into a slot in the plate $O^2$, substantially as set forth.

23. In a planter, the combination with the seeding mechanism, and the rock-shaft for actuating it, of a sleeve fitted loosely on the shaft and provided with an arm $H^2$, check-row devices connected with said arm, a stationary lug on the rock-shaft extending across one face of the arm $H^2$, a hand-lever, a pivoted plate $O^2$ connected with said lever, another plate $O^4$ pivoted on the same center as the plate $O^2$ and having a pin-and-slot connection therewith, and a link connecting the rock-shaft with the plate $O^4$, substantially as set forth.

24. The combination with the wheel-frame, and the runner-frame hinged thereto, of the seeding mechanism mounted on the runner-frame, mechanism supported on said frame for intermittingly actuating the seeding mechanism, the rotating devices mounted on the runner-frame independently of said intermittingly-actuating mechanism for continuously actuating the seeder mechanism, power devices on the wheel-frame, and connecting devices, independent of the intermittingly-acting mechanism, for transmitting power therefrom to the continuously-rotating mechanism on the runner-frame, substantially as set forth.

25. The combination with the two seeding mechanisms, of the intermittingly-acting rock-shaft mounted behind them, the pawl mechanism interposed between the rock-shaft and the seeding devices and the independently-mounted continuously-rotating shaft adapted to be connected to the seeding mechanism, substantially as set forth.

26. In a planter, the combination of check-row devices, a rock-shaft, a seed-receptacle, seed-dropping devices, means for intermittingly delivering the seed from the receptacle to said dropping devices and means connecting said dropping devices to said rock-shaft, substantially as set forth.

27. In a planter, the combination with a wheel-frame, and a runner-frame hinged together, of a lever fulcrumed in one frame and connected with the other to adjust the same vertically and an adjustable stop adapted to move through a path concentric with the fulcrum of said lever and adapted to limit the movement of the lever in one direction, substantially as set forth.

28. In a planter, the combination with a wheel-frame and a runner-frame hinged together, of a foot-lever fulcrumed on the wheel-frame and connected with the runner-frame, a pivoted stop-bar adapted to lie in the path of the rear end of the foot-lever and a movable stop fitted to said bar and extending into the path of the rear end of said lever when the stop-bar is moved from the path thereof, substantially as set forth.

29. In a planter, the combination with a wheel-frame and a runner-frame hinged together, of a lever fulcrumed on the wheel-frame and provided at both ends with foot-rests, a curved stop-bar pivoted above said lever and adapted to have its lower end moved into the path of the lever, a block supported on said bar, and adapted to be adjusted longitudinally thereof, and a foot-lever independent of that aforesaid for moving said stop-bar, substantially as set forth.

30. In a planter, the combination with a wheel-frame and a runner-frame hinged together, of a bracket on the wheel-frame, a lever fulcrumed on said bracket and connected to the runner-frame, foot-rests on said lever, a curved stop-bar fulcrumed on a support above said lever, and having one edge provided with a series of teeth, a block fitted around said bar and adapted to be engaged with the teeth thereon and an independent lever for adjusting said stop-bar, substantially as set forth.

In testimony whereof I affix my signature in presence of two witnesses.

JOHN B. BARTHOLOMEW.

Witnesses:
HENRY D. KELLENBACH,
ELVON M. VOORHEES.